US006568971B1

(12) United States Patent
Abbenhouse et al.

(10) Patent No.: US 6,568,971 B1
(45) Date of Patent: May 27, 2003

(54) KAYAK PADDLE

(76) Inventors: John Abbenhouse, 15145 NE. 90th St., Redmond, WA (US) 98052; Clinton T. Schneider, 2735 Briggs St., Missoula, MT (US) 59801

( * ) Notice: Subject to any disclaimer, the term of this patent is extended or adjusted under 35 U.S.C. 154(b) by 0 days.

(21) Appl. No.: 09/928,642

(22) Filed: Aug. 10, 2001

Related U.S. Application Data

(60) Provisional application No. 60/224,285, filed on Aug. 10, 2000.

(51) Int. Cl.[7] .............................................. B63H 16/04
(52) U.S. Cl. ........................ 440/101; 416/70 R; 416/74
(58) Field of Search ....................... 440/101; 416/70 R, 416/74

(56) References Cited

U.S. PATENT DOCUMENTS

| 4,955,839 | A | * | 9/1990 | Kaschper ...................... 416/74 |
| 5,820,424 | A | * | 10/1998 | Steinhour et al. ........... 440/101 |
| 2002/0025423 | A1 | * | 2/2002 | Dreher et al. ............ 428/318.4 |

FOREIGN PATENT DOCUMENTS

| FR | 2 599 331 | * | 12/1987 |
| GB | 1165343 | * | 9/1969 |

OTHER PUBLICATIONS

"Reinforced Plastics Make Metals Look Weak" Johnson, Greene, Machine Design, 8/00.

* cited by examiner

*Primary Examiner*—Sherman Basinger
(74) *Attorney, Agent, or Firm*—J. Michael Neary

(57) ABSTRACT

The invention includes processes and products made by the processes. The processes include making a two-part mold having semi-cylindrical openings for the paddle shaft so that the paddle blade may be molded and co-cured directly on the paddle shaft. The mold surfaces correspond to the ultimate outer mold line of the paddle, and also are designed to express liquid resin from the centerline of the paddle outward toward its edges as the mold closes or to fuse and consolidate thermoplastic resin such as polypropylene on glass fiber. The mold closing and heating schedule is designed to partially cure the resin so that it flows outward through the reinforcing fiber at a controlled rate, preventing resin starvation of the fiber reinforcement and ensuring complete expulsion of any air bubbles in the reinforcing fiber. The mold is opened and the paddle is removed from the mold for trimming by a high speed CNC router to produce a paddle that conforms exactly to the desired peripheral shape.

15 Claims, 9 Drawing Sheets

KAYAK PADDLE

This relates to U.S. Provisional Application No. 60/224,285 filed on Aug. 10, 2000 and entitled "Kayak Paddle".

This invention pertains to processes for making paddles, and more particularly to efficient processes for making superior quality kayak paddles with composite blades and the kayak paddles made by those processes.

BACKGROUND OF THE INVENTION

Since the invention of the kayak by the ancient peoples of Alaska and Iceland, there has been a continual effort on the part of kayakers to improve the design and construction of kayak paddles. Efficient paddle design is an optimal balance of minimal weight, maximal strength, optimal stiffness, effective performance in the water, and low cost.

All modern high performance paddles are composite constructions of fiber reinforced resin blades on hollow shafts, also made of fiber reinforced plastic materials. The blade is normally molded in a two-part die machined to the desired blade shape, and the molded blade is then fitted to a purchased paddle shaft. Among the many problems of prior art composite paddles are excessive blade molding time because of the cure time for the resin, and excessive blade weight because of excess resin in the cured blade. The attachment of the blade to the paddle shaft is normally a lengthy, multi-step process fraught with potential for failure.

SUMMARY OF THE INVENTION

Accordingly, this invention provides a fast and efficient process for making kayak paddles and a kayak paddle having the desired mechanical properties of strength, light weight, durability and effective propulsion effect.

The invention includes a process for manufacturing paddles, and the paddles made by the process. The process includes making a two-part mold having semi-cylindrical openings for the paddle shaft so that the paddle blade may be molded and co-cured directly on the paddle shaft. The mold surfaces correspond to the ultimate outer mold line of the paddle, and also are designed to express liquid resin from the centerline of the paddle outward toward its edge as the mold closes. The mold closing and heating schedule is designed to partially cure the resin so that it flows outward through the reinforcing fiber at a controlled rate, preventing resin starvation of the fiber reinforcement and ensuring complete expulsion of any bubbles in the reinforcing fiber. The mold is opened and the paddle is removed from the mold. The paddle edge is then trimmed by a high speed CNC router to produce a paddle that conforms exactly to the desired peripheral shape.

DESCRIPTION OF THE DRAWINGS

The invention and its many attendant benefits and advantages will become better understood upon reading the following detailed description of the preferred embodiments in conjunction with the following drawings, wherein.

DETAILED DESCRIPTION OF THE PREFERRED EMBODIMENTS

Figure 1:
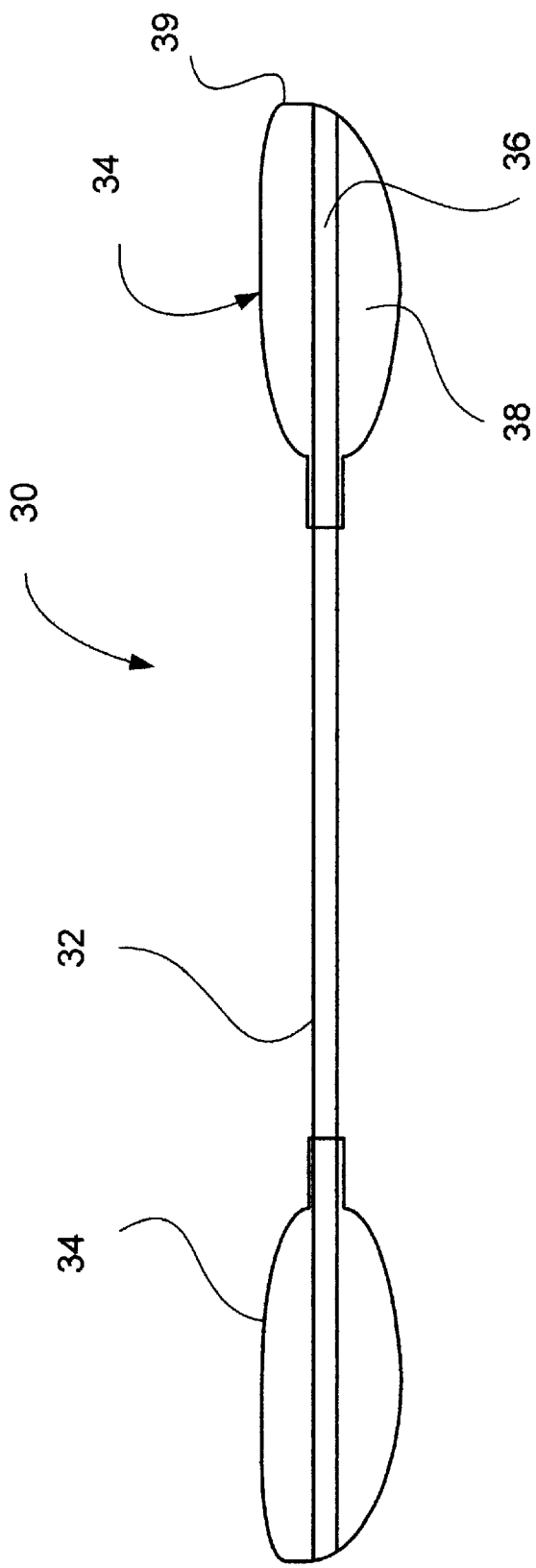
FIG. 1 is a paddle in accordance with this invention.

Turning now to the drawings, and more particularly to FIG. 1 thereof, a kayak paddle 30 in accordance with this invention is shown having a paddle shaft 32 and a paddle blade 34 at each end of the shaft 32. The shaft 32 is preferably a commercially available carbon fiber/epoxy tube purchased from any of several suppliers, although other shaft materials such as fiber glass/epoxy or pultruded fiberglass and carbon fiber/epoxy could be used to reduce the cost of the paddle and improve toughness, but their strength-to-weight and stiffness-to-weight ratios are generally inferior to carbon fiber/epoxy. The carbon fiber/epoxy shaft 32 has a wall thickness of about 0.055" and an outside diameter of about 1.25" which is convenient for the average man's hand, but smaller shafts, on the order of one inch, can be used for paddlers having smaller hands such as children and some women. Thicker paddle shaft wall thickness can be used to obtain greater strength, primarily of interest to whitewater kayakers, but at a greater weight and cost. An indexing flat 35, shown in FIG. 2 and described in more detail below, is formed along the shaft 32 at the position of one or both hands when gripping the paddle to assist the paddler in orienting the paddle in his hands for the optimal angle of the blade 34 with respect to the water surface. The blades 34 are made and bonded to the shaft 32 by a process described below.

Figure 2:
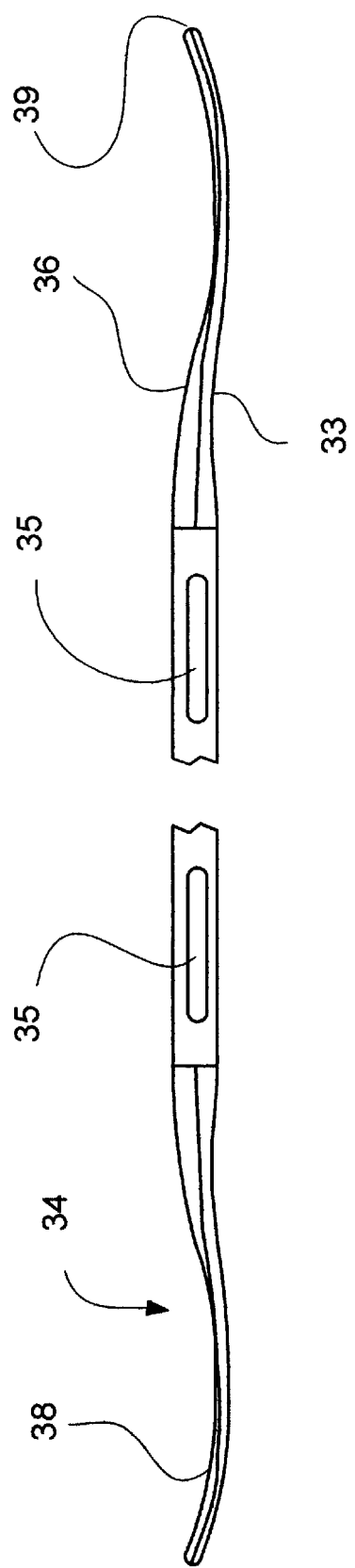
FIG. 2 is an elevation of the paddle shown in FIG. 1.
Figure 3:
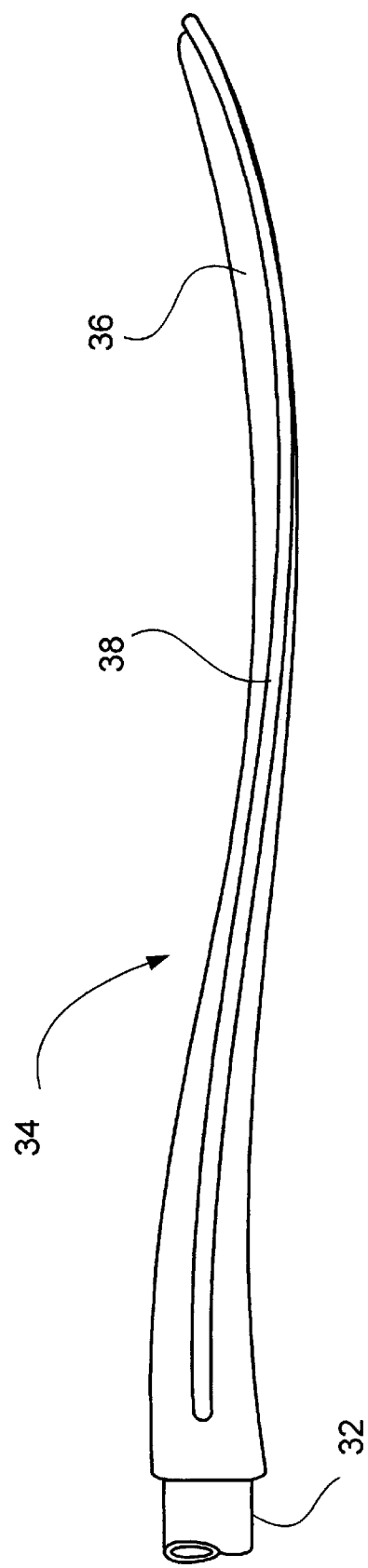
FIG. 3 is an elevation of one paddle blade of the paddle shown in FIG. 1 and the end of the paddle shaft to which the blade is bonded.

The blades 34 are spoon-shaped, as shown in FIGS. 2 and 3, having a generally concave power face and a generally convex back face, with a small concave "low brace" power section 33 on the back face. A center stiffening rib 36 extends the full length of the blade fins 38 can be made of 39, and blade fins 38 extend laterally outward from the rib 36. The blade fins 38 can be made of carbon fiber fabric/epoxy about 0.70" thick or other combinations of fiber materials such as glass fiber fabric and Kevlar and carbon fiber fabric may be used to provide desired properties of strength, stiffness, toughness and light weight. The fiber materials are normally used in fiber mats, performed to the desired thickness, length and width. Another material, heretofore unused in kayak paddles, has produced excellent kayak paddle blades is a thermoplastic material known as Twintex. It is woven from glass fibers individually coated with a thin film of polypropylene. It does not outgas during molding, does not require curing time, and is tough and light weight, as described in greater detail below.

Various blade shapes and dimensions are used for various paddling environments and paddler strengths. A typical sea kayak paddle blade for an expedition sea kayaker is about 20.5" long and about 6.5" wide. Sea kayakers desiring more relaxed and shorter distances will usually select a narrower and sometimes longer paddle blade. Whitewater kayakers usually prefer a shorter, wider blade, e.g. 7.5" wide and 19" long. The process described herein for molding the blade can easily accommodate these various blade shapes and dimensions.

Figure 4:
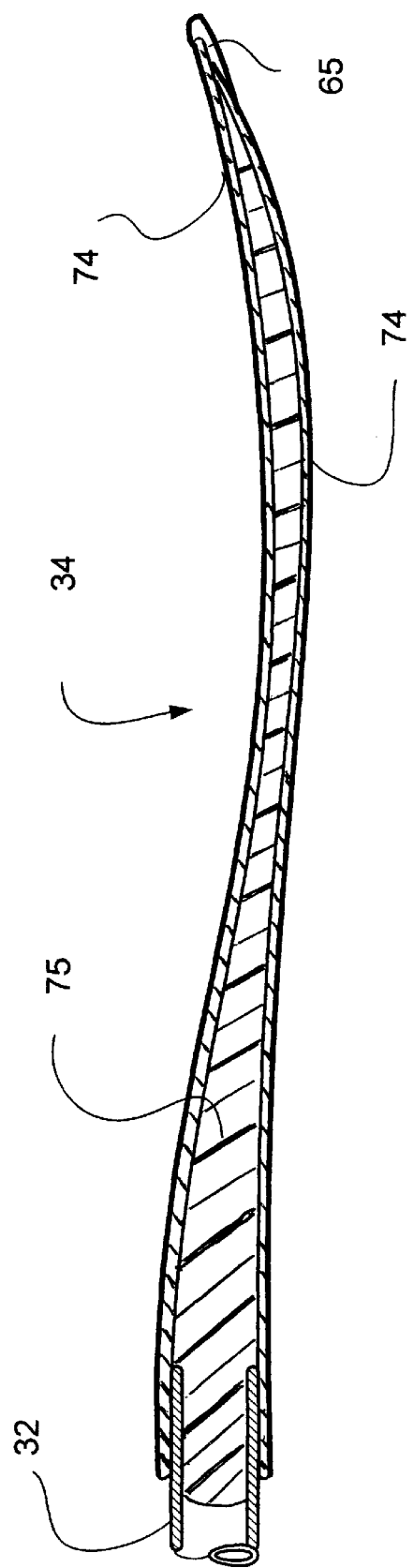
FIG. 4 is sectional elevation on a vertical axial section plane in FIG. 3.
Figure 5:
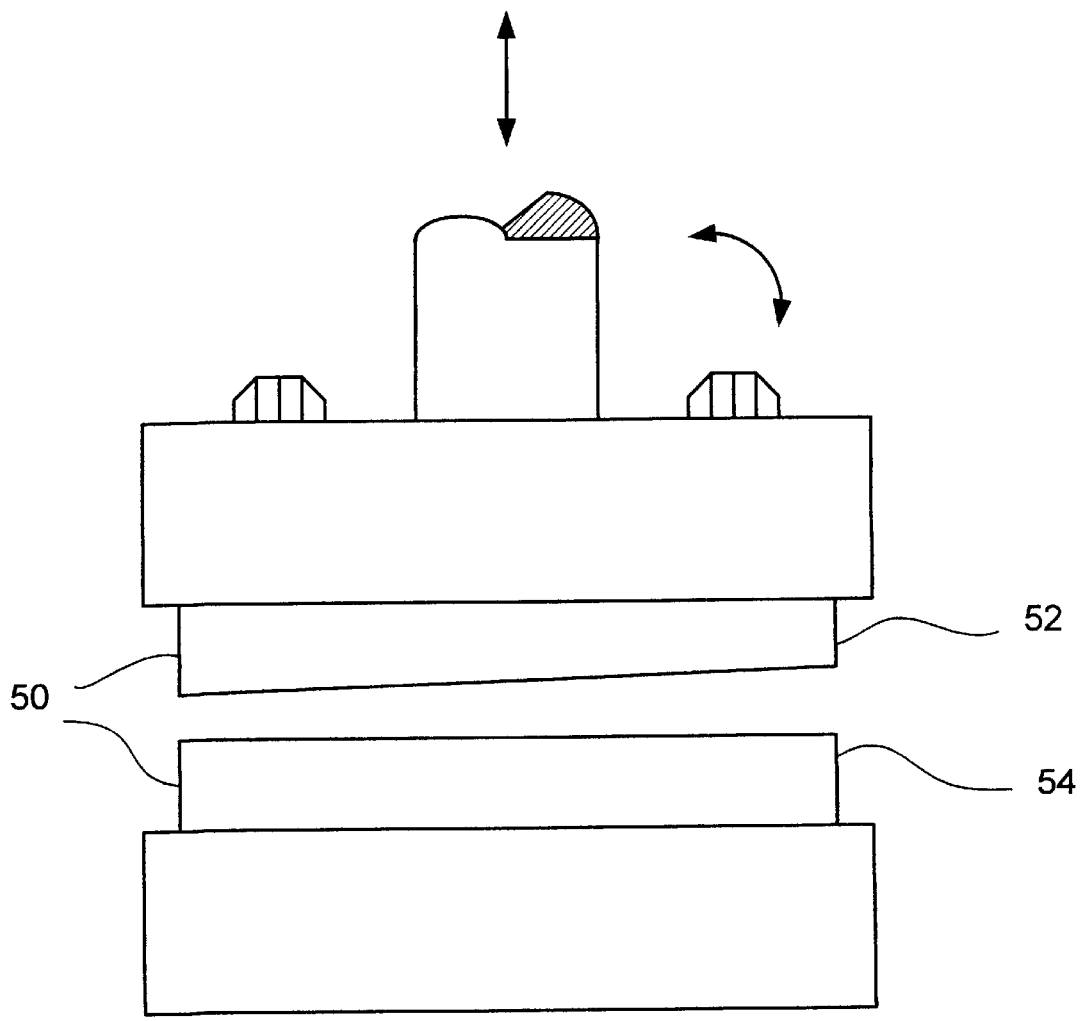
FIG. 5 is a schematic elevation of a press in which a matched two-part clam-shell mold is mounted for molding the paddle blades and bonding them to the paddle shaft to form the paddle shown in FIG. 1.
Figure 6:
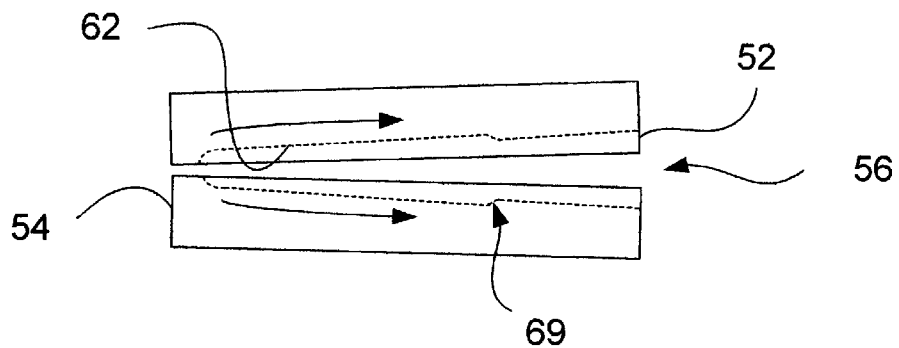
FIG. 6 is an elevation of the two-part mold shown in FIG. 5, illustrating the clam-shell disposition of the mold halves to each other.
Figure 7:
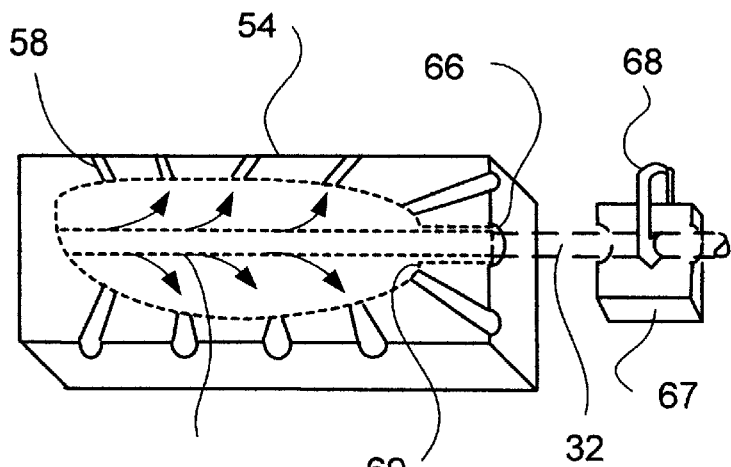
FIG. 7 is a perspective view of the lower mold half shown in FIG. 6, showing the outline of the paddle blade as it will look after trimming.

The process for making the kayak paddle in accordance with this invention utilizes a two-part clam-shell mold 50 for use in a press, shown schematically in FIG. 5. The mold 50, shown in more detail in FIGS. 6 and 7, includes an upper mold half 52 and a lower mold half 54. The facing surfaces of the mold halves 52 and 54 have surface contours defining the upper and lower mold lines of a mold interface 56 having the shape of the paddle blade 34. A plurality of grooves 58 in the lower mold half 54 define restricted flow channels 60 out of the mold interface 56 to restrict the flow of resin out of the mold during the mold closing sequence, as explained in more detail below. A semi-cylindrical axial rib channel 62 extends in the floor of the upper mold half 52 the full length of the mold, and a corresponding channel 64 extends in the mold surface of the bottom mold half 54 about ⅔–¾ of the length of the paddle mold surface, as indicated in FIG. 7, to form the axial strengthening rib 36 in the paddle blade 34, as shown in FIGS. 1–4. The remaining ⅓–¼ of the rib molding contour of the bottom mold half is reversed into a ridge to match the outer portion of the channel 62 in the upper mold half to form a U-shaped ridge 65 at the outer portion of the strengthening rib 36, as shown in FIG. 4.

A semi-cylindrical paddle shaft channel 66 at the paddle end of the mold halves 52 and 54, as shown in FIG. 7, receives the end of a paddle shaft 32 which is supported in a V-block 67 or the like positioned along the axis of the channel 64 and the paddle shaft channel 66, and is held therein by a clamp 68. A chamfer 69 at the junction of the paddle shaft channel 66 and the axial rib channel 64 provides a smooth and attractive junction of the paddle blade 34 and paddle shaft 32 in the molded paddle 30.

The process of molding the paddle blade 34 and simultaneously bonding the paddle blade to the paddle shaft 32 starts with measuring two volumes of mixed liquid epoxy resin and hardener. Various resin formulations may be used, but the preferred materials are resin 833 and hardener 944 sold by Composites One in Arlington, Wash., mixed in a resin to hardener ration of 4:5. The two ingredients are preferably mixed in a resin mixer, although the ingredients can be mixed by hand if production throughput is not important.

The facing surfaces of the mold are coated with a mold release that is effective to prevent the epoxy formulation being used from sticking to the mold surfaces, which otherwise would present an extremely difficult clean-up job after the paddle is removed from the mold and would produce a paddle with very poor surface quality. There are numerous commercial mold release products available any one of them can be used that is effective. Release films are also available and can be used, but the preferred mode is to use a spray or liquid coating material to avoid the chance of wrinkle marks produced by wrinkles in a release film.

Figure 8:
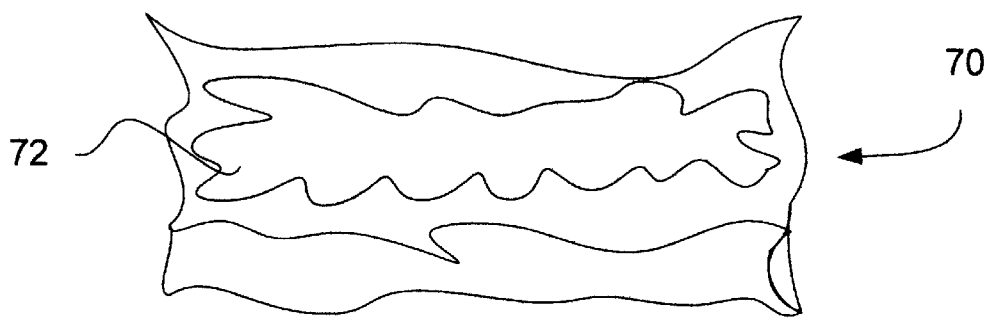
FIG. 8 is a plan view of a fiber preform with a resin load used to form the paddle blade shown in FIG. 3.

A preselected fiber preform 70 having the desired fiber content for the paddle being made is laid on a work surface and one of the two volumes of mixed liquid epoxy resin and hardener is poured onto the fiber preform 70 in a central axial zone on the preform and is spread in a broad band 72, as shown in FIG. 8, on the fiber preform 70 with a squeegee or the like. A cover sheet 74 of polybutylene terephthalate (PBT) with graphics for marketing and source identification is laid on the lower mold half 54, and the fiber preform 70 with its resin load is laid over the PBT sheet in the lower mold half 54 with the edge of the fiber preform aligned with the chamfer 69. A molded foam core 75 having the desired shape of the rib 36 is inserted into the end of the paddle shaft 32 and the paddle shaft is laid in the paddle shaft channel 66 and the V-block 67 with the foam core 75 lying in the axial rib channel 64. The clamp is engaged to hold the paddle shaft 32 securely in position in the paddle shaft channel 66 over the first resin-loaded fiber preform 70. A second preselected fiber preform 70 is laid on the work surface and the second volume of mixed resin and hardener is poured onto the second fiber preform 70 in an central axial zone, like the first. The resin is spread in a broad axial zone with a squeegee like the first, and the second resin-loaded fiber preform is laid over the end of the paddle shaft 32 and foam core 75 in alignment with the first fiber preform. A second cover sheet 74 of PBT with graphics for marketing and source identification is laid over the second resin-loaded fiber preform 70. The fiber preforms 70 and the PBT cover sheets are laid carefully to lie flat and avoid wrinkles which could result in an unsightly uneven appearance and could weaken the blade. To speed the production through the press, the fiber preforms can be pretensioned in a wire frame that extends beyond the molds so the workers do not need to spend time smoothing the fiber preforms to avoid wrinkles.

Figure 9:
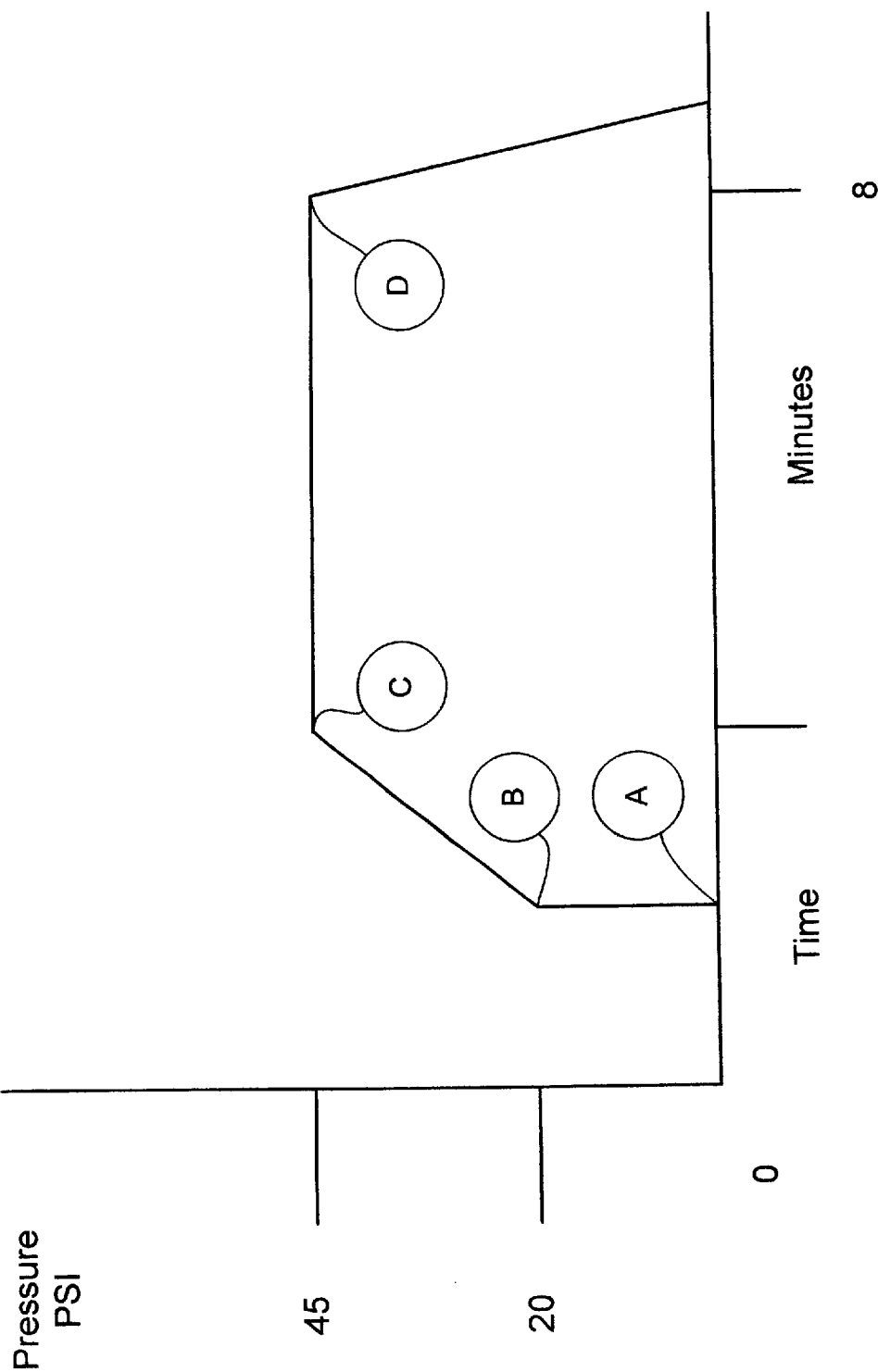
FIG. 9 is a graph showing the mold closing and pressure schedule for operating the press shown in FIG. 5 to close the mold shown in FIG. 6.

When the upper and lower resin-loaded fiber preforms are in place on both sides of the end of the paddle shaft 32 and the foam core 75, the press is activated to execute and automatically timed mold closing sequence as shown in the graph in FIG. 9. The press is started at time zero and the mold halves make contact a few seconds later at point A, whereupon the pressure in the press rises almost immediately to the beginning pressure of 20 PSI at the start of the pressure ramp at point B. The pressure is gradually ramped up to the final pressure of about 45 PSI at point C over several minutes. This provides time for the resin to fully saturate the cloth as well as allowing time for air in the fabric preform 70 to be displaced from the fabric by the resin as it is driven outward and toward the paddle shaft end, as indicated by the flow arrows in FIG. 7, by the slowly closing clam-shell mold halves to the flow channels 58 and out of the paddle mold. The mold halves close in clam-shell fashion from the blade-tip end toward the paddle shaft end by virtue of the slight angle of the mold faces as indicated in FIG. 6, wherein the mold is still 0.045"–0.065" apart at the paddle shaft end when it first makes contact at the blade tip end. The upper mold half 52 can tilt slightly as necessary to execute the clam-shell closing action by virtue of the flexibility of the press which allows a small tilting motion under pressure. The temperature of the mold halves 52 and 54 is maintained constant at about 170°–174° F. As the resin becomes warm in the mold, its viscosity decreases and it flows easily to wet the fabric. However, the increasing temperature accelerates the curing of the resin mixture and its viscosity increases, thereby providing a fluid wall as it advances through the fabric preforms 70, driving the air before it. The curing of the resin is an exothermic reaction, which raises the temperature in the mold interface to accelerate the rate of curing. At the end of the curing cycle, at point D, the pressure in the press ram is released and the mold opens, allowing the cured paddle blank to be removed.

A paddle blade 34 is now molded and bonded to the other end of the paddle shaft 32 in a similar operation to the one described above, on a similar but reversed two-part mold.

Alternatively, if production through put from the molding facility is paramount, two presses could be set up parallel to and spaced apart from each other to allow workers to mold and bond the paddle blades on opposite ends of the paddle shaft 32 at the same time. Alternatively, or in addition, several sets of molds 52 and 54 could be mounted on the platens of the press, thereby increasing the production throughput from a single press.

The paddle with the molded and bonded blade blanks is mounted on a fixture which holds it securely for trimming the blade 34 to the desired profile. An efficient and accurate trimming apparatus is a CNC operated air driven router, operated at about 20,000 RPM. At that sped, the composite material is cut cleanly without shredding or chipping the epoxy material, and the CNC controller cuts the molded blade to exactly the same profile every time.

Paddle blades made of polypropylene and glass fiber do not need a cure time since polypropylene is a thermoplastic material. The preferred form of polypropylene coated glass fiber material is a co-extruded polypropylene coating on a monofilament glass fiber and provides a linear orientation of the polypropylene molecules for superior properties in the consolidated fused final product. Twintex is the commercial supplier of this material. The molding process provides heat and pressure for sufficient time to fuse and consolidate the polypropylene in the Twintex material, and then holds the formed paddle blade in the desire configuration while the polypropylene hardens enough to hold its shape. By thoroughly cleaning the end of the paddle shaft 32 and providing sufficient pressure to the Twintex material on the end of the paddle shaft, the polypropylene can be made to bond securely to the carbon fiber/epoxy material in the paddle shaft 32.

Two fiber preforms of Twintex polypropylene/glass fiber material are prepared with the desired number of layers of the Twintex fabric and a cover sheet of polybutylene terephthalate (PBT) which may be provided with graphics for marketing and source identification. A clam-shell mold is preheated to about 400° F.–412° F. and the first preform is laid in the lower mold half 54. The carbon fiber shaft 32, with its end thoroughly cleaned of oils and mold release from its manufacture and with the foam core 75 protruding from the end, is set in the V-block and the paddle shaft channel 66. The second fiber preform is laid over the first in alignment therewith, sandwiching the end of the paddle shaft 32 and the foam core 75. The second fiber preform also has a PBT top skin. The molds 52 and 54 are closed and pressure of about 42 PSI is applied to the materials for about one minute or until the polypropylene is fused and the material is consolidated into a semi-solid material. The mold is then opened and the fused, bonded, formed and consolidated paddle blade blank is removed from the mold. The PBT face skins function as a mold release as well as providing structural qualities. The hot paddle blade 34 is immediately placed in an identical mold that is at room temperature. The mold is closed and pressure of about 9–10 PSI is applied for about one minute in the cool mold while the blade 34 cools to about 170° F. or less and hardens so that it retains its shape when removed from the cooling mold. Both forming and cooling molds can be in the same press or the forming molds can be in a separate press from the cooling molds. The paddle blade may be, stiffened with a sheet of carbon fiber fabric between the PBT face sheets and the fiber preform. If sufficient polypropylene material is available on the glass fiber, it will flow into the carbon fiber and provide a strong bond therewith. Otherwise, a small amount of epoxy resin can be used for bonding or the carbon fiber cloth can be pre-impregnated with epoxy resin in the B-stage cure condition.

An alternate process using only a single mold uses a radiant heat source to heat the polypropylene/glass fiber preforms to a temperature at which the polypropylene softens and is ready to fuse. The hot fiber preforms, with or without PBT face sheets, are inserted into a cool mold, sandwiching the end of the paddle shaft and foam core 75, and the mold is closed with 40–50 PSI to consolidate the polypropylene and bond it to the end of the paddle shaft, as above. The mold is opened in about one minute after the blade is cool enough to retain its shape.

The polypropylene/glass paddle blade is molded to net size, so no trimming is needed except for a possible thin flash around the periphery of the paddle. The savings in labor, material cost and rapid molding rate, and the desirable properties of light weight and toughness make this material a very attractive one for kayak manufacturing.

Figure 10:
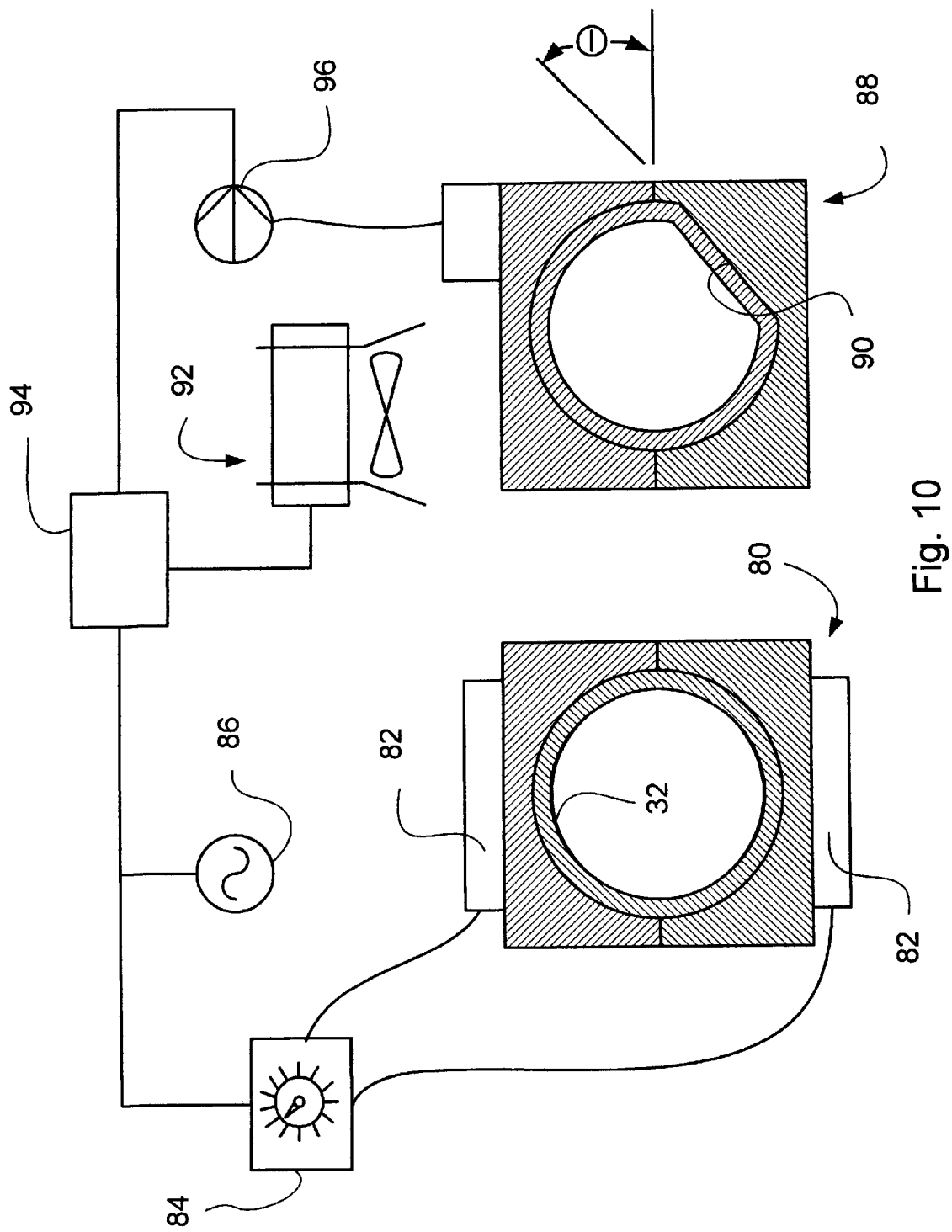
FIG. 10 is a sectional end elevation of an apparatus for forming an indexing surface on addle shaft shown in FIG. 2.

Paddle shaft indexing flats are formed on the paddle shaft 32 in the apparatus shown in FIG. 10. A split heating mold 80 is provided with heating coils 82 connected by power and control cables to a temperature controller 84 which controls electrical power from a power source 86, such as the power grid, to the heater elements 82. The temperature in the split mold 80 is set at about 325° F. The paddle shaft 32 is inserted in the split mold 80 and a section of paddle shaft about 12 inches long is heated in the mold 80 for about 20–30 seconds, until it approaches the mold temperature and becomes soft enough to form. The heating mold 80 is opened and the hot section of paddle shaft is immediately inserted into an open split forming mold 88. One of the mold halves of the split mold 88 has an indexing surface 90 by which the soft heated paddle shaft wall is formed with the indexing surface 35. The carbon/epoxy shaft material cools quickly in the cool forming mold 88 and may be removed in 10–15 seconds. If there is a large run of paddles that are to have the indexing flats formed, the forming mold 88 may be cooled with a cooling system such as a blower 92 controlled by a blower controller 94 using a temperature transducer 96.

Figure 11:
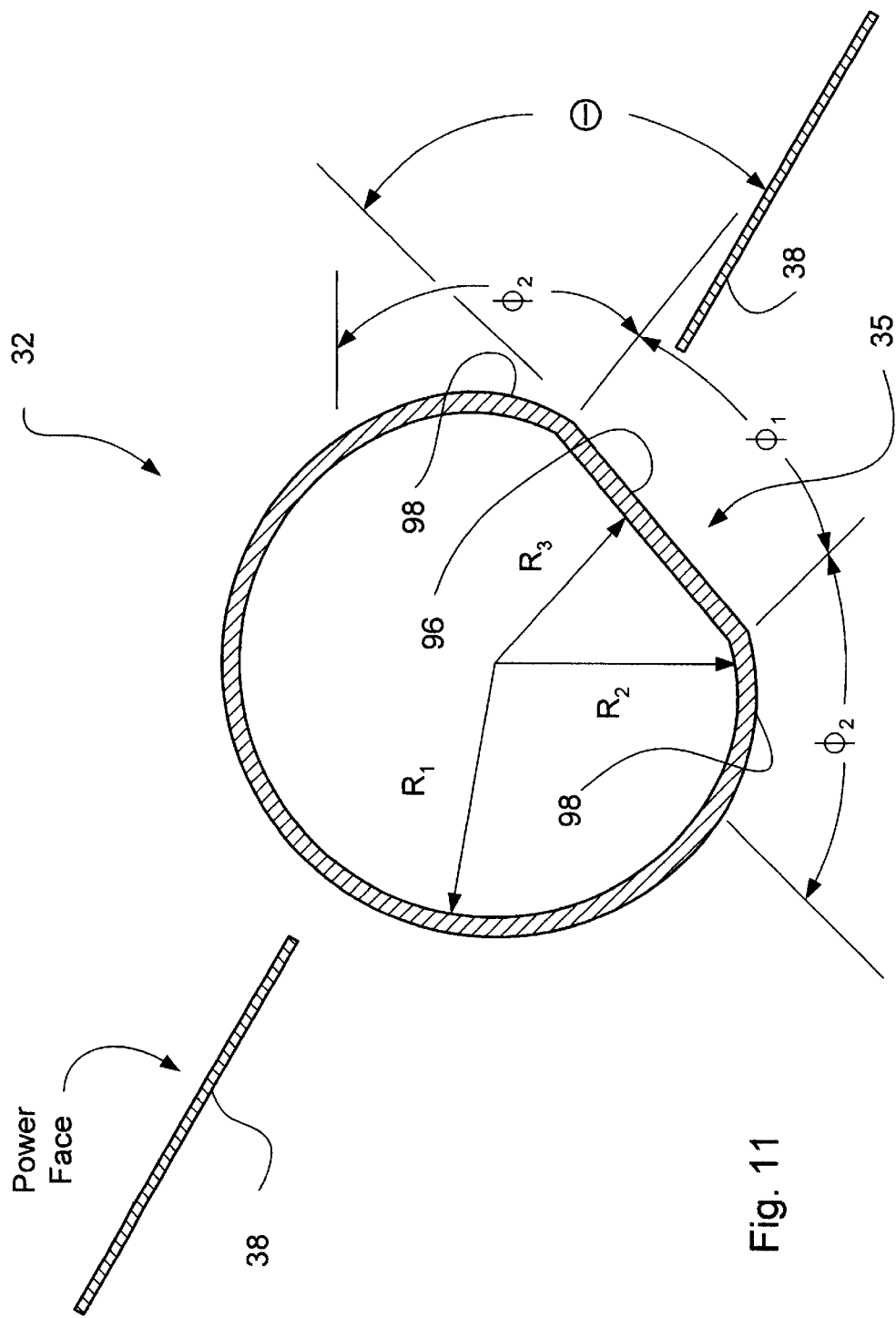
FIG. 11 is an enlarged sectional elevation of the paddle shaft shown in FIG. 10.

The profile of the indexing surface 35 on the paddle shaft 32, shown in detail in FIG. 11, includes a first surface 96 that is flat or nearly flat, having a radius $R_3$ and subtends an angle $\phi_1$ of about 45°. On both sides of the first surface 96 are two blending surfaces 98 each having a radius of about $R_2$ and subtending an angle $\phi_2$ equal to about 15°. Blending surfaces 98 provide a smooth transition from the first surface 96 into the full radius surface of the paddle shaft 32. The first surface 96 lies at an angel $\theta$ from the plane of the power face of the fins 38 of the paddle blade 34. The angel $\theta$ is about 60°–85°, preferably 72°.

Entire kayaks can be manufactured with polypropylene/glass composite. The polypropylene/glass composite fabric is applied to the inside of a kayak hull mold and pressed in place with a vacuum bag. The mold is heated to the fusing temperature of the polypropylene by electrical heater elements on the outside surface of the mold, or can be heated in an oven. After the polypropylene is fused and the material consolidated, the temperature can be reduced naturally or by forced cooling and the kayak shell removed from the mold.

An integral one-piece polypropylene/glass kayak can be made by applying the material in the form of fabric to the inside surface of a kayak hull mold. After the inside surface is completely covered to the desired thickness, an inflatable bladder of high temperature material is placed in the mold and inflated to fill the mold. Additional strips polypropylene/glass fabric is laid over the bladder and between the bladder and the sides of the hull mold to produce a complete fabric envelope around the bladder. A cover plate of the desired upper shape for the kayak is bolted to the top rim of the hull mold and the bladder is inflated to full pressure, forcing the fabric against the inside of the kayak hull and deck mold. The mold is placed in an oven and heated to the fusing temperature of polypropylene to fuse and consolidate the polypropylene/glass fabric into a solid and rigid material. The mold is then cooled and the bladder deflated. The deck mold is unbolted and removed and the deflated bladder is removed from the kayak through the cockpit opening. The kayak deck can be made in the same way and the hull and deck can be attached and fused by heat and pressure to provide a secure attachment.

The polypropylene/glass kayak would be very tough and would be easily repaired in the event of damage. Stiffness can be increased, if desired, by the use of a carbon fabric sheet on the outside or inside of the hull and deck, or both, which would be co-bonded to the polypropylene/glass hull and/or deck using the same process noted above in the description of the polypropylene/glass paddle blades.

Obviously, numerous modifications and variations of the preferred embodiment described above are possible and will become apparent to those skilled in the art in light of this specification. Moreover, many functions and advantages are described for the preferred embodiment, but in many uses of the invention, not all of these functions and advantages would be needed. Therefore, we contemplate the use of the invention using fewer than the complete set of noted features, process steps, benefits, functions and advantages. For example, all the process elements may be used to produce a particular part that requires the characteristics provided by each process element, or alternatively, they may be used in combinations that omit particular process elements or substitute others to give the desired characteristics of the part. Moreover, several species and embodiments of the invention are disclosed herein, but not all are specifically claimed, although all are covered by generic claims. Nevertheless, it is our intention that each and every one of these species and embodiments, and the equivalents thereof, be encompassed and protected within the scope of the following claims, and no dedication to the public is intended by virtue of the lack of claims specific to any individual species. Accordingly, it is expressly intended that all these embodiments, species, modifications and variations, and the equivalents thereof, in all their combinations, are to be considered within the spirit and scope of the invention as defined in the following claims, wherein

We claim:

1. A process of making a kayak paddle, comprising:
   selecting two fiber preforms having resin therein;
   laying one of said preforms in a lower half of a split mold;
   inserting an end of a paddle shaft in a cylindrical recess in said lower mold half;
   laying the other fabric preform over said paddle shaft end and over said first fiber preform;
   closing an upper half of said split mold over said lower mold half and applying heat and pressure to produce a solid fiber-reinforced resin matrix paddle blade bonded to said paddle shaft.

2. A process of making a kayak paddle as defined in claim 1, further comprising:
   closing said mold from one end in clam-shell fashion and creating thereby a fluid wall of liquid resin which advances through said fiber preforms as said mold closes and drives air out of said fabric preforms as said resin advances through said fiber preforms.

3. A process of making a kayak paddle as defined in claim 2, wherein:
   said resin in said fiber preforms is added as liquid epoxy resin to said fiber preforms immediately prior to inserting said fiber preforms in said mold.

4. A process of making a kayak paddle as defined in claim 3, wherein:
   said mold halves are maintained at a constant temperature of about 170°–174° F. during molding.

5. A process of making a kayak paddle as defined in claim 3, wherein:
   said pressure is applied in a pressure schedule of a gradually increasing pressure over several minutes to provide time for said resin to fully saturate said fiber preform and for air in said preform to be displaced therefrom by said resin as said resin is driven outward and axially through said mold by said closing clam-shell mold halves.

6. A process of making a kayak paddle as defined in claim 5, further comprising:
   allowing excess resin to escape from said mold during molding through flow channels around edges and an end of said mold.

7. A process of making a kayak paddle as defined in claim 2, wherein:
   said pressure is applied from a blade-tip end toward a paddle shaft end by virtue of a slight angle between adjacent faces of said molds.

8. A process of making a kayak paddle as defined in claim 7, wherein:
   said angle between said mold faces is created by mounting said molds in a press with said mold halves at said paddle shaft end apart a small distance when said mold halves first make contact at said blade tip end.

9. A process of making a kayak paddle as defined in claim 8, wherein:
   said small distance is about 0.045"–0.065".

10. A process of making a kayak paddle as defined in claim 1, further comprising:
    laying a cover sheet of polybutylene terephthalate with graphics for marketing and source identification on said lower mold half under said fiber preform for bonding as an outer skin of said paddle during molding.

11. A process of making a kayak paddle as defined in claim 1, wherein:
    said two fiber preforms are glass fiber, and said resin is polypropylene coating said glass fibers.

12. A process of making a kayak paddle as defined in claim 1, wherein:
    said fiber preform includes two glass fiber cores, with polypropylene coating said glass fibers, and two sheets of carbon fiber fabric above and below said polypropylene coated glass fiber cores.

13. An apparatus for making kayak paddles having a paddle shaft and a paddle blade at each end of said shaft, each blade having a tip end and a shaft end where it attaches to said shaft, comprising:
    a clam-shell mold for use in a press, said mold being mounted in said press oriented to contact at one end and tilt as it closes to exert a pressure wave from said tip end toward said shaft end;
    said mold halves defining therebetween a mold cavity for receiving a fiber preform and a charge of resin;
    semi-cylindrical recesses for receiving an end of said paddle shaft for holding said paddle shaft while bonding said fiber preform with said resin to said shaft during consolidating said resin in said preform to produce said blade.

14. An apparatus for making kayak paddles as defined in claim 13, further comprising:

escape openings around edges of said mold to allow excess liquid resin to escape from said mold as said mold closes and drives liquid resin through said fiber preform and out of said mold through said escape openings.

15. A process for producing an indexing surface on a kayak paddle shaft, comprising:

inserting said paddle shaft in a split heating mold heated to a temperature of about 325° F. and heating said paddle shaft in said heating mold for about 20–30 seconds, until said paddle shaft approaches said mold temperature and becomes soft enough to form;

opening said heating mold arid removing said hot paddle shaft therefrom;

inserting said hot section of said paddle shaft immediately into an open split forming mold having two mold halves, one of which mold halves has an indexing surface by which said soft heated paddle shaft wall is formed with said indexing surface; and removing said formed paddle shaft from said forming mold and cooling said paddle shaft to room temperature.

\* \* \* \* \*